Figure 1:
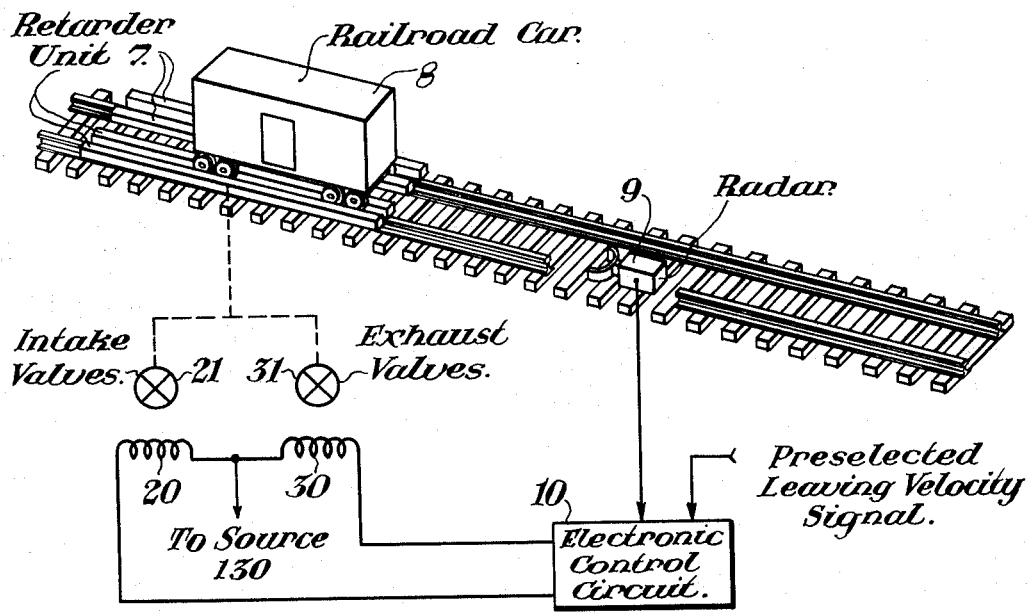

July 12, 1966 R. D. CAMPBELL ETAL 3,260,843
CONTROL CIRCUITS
Filed Aug. 7, 1957 2 Sheets-Sheet 1

INVENTORS
Richard D. Campbell and
James A. Cook Jr.
BY W. L. Stout
THEIR ATTORNEY INVENTORS
Richard D. Campbell and
James A. Cook Jr.
BY
W. L. Stout.
THEIR ATTORNEY

United States Patent Office 3,260,843
Patented July 12, 1966

3,260,843
CONTROL CIRCUITS
Richard D. Campbell, Harmarville, and James A. Cook, Jr., Wilkinsburg, Pa., assignors to Westinghouse Air Brake Company, Wilmerding, Pa., a corporation of Pennsylvania
Filed Aug. 7, 1957, Ser. No. 676,732
9 Claims. (Cl. 246—182)

This invention relates to control circuits, and more particularly to an electronic control circuit arranged to provide control signals for railroad car retarders.

Automatic or mechanized railway classification yards provide a means for handling a large capacity of rail tonnage efficiently and expeditiously. The copending application for Letters Patent of the United States, Serial No. 676,730, filed on August 7, 1957, by David P. Fitzsimmons and William A. Robison, Jr., for Automatic Control System for Railway Classification Yards, and having the same assignee, discloses one type of gravity-fed automatic railway classification yard control system. Car retarder units which control the velocity of cars moving down the grade of the classification yard are one of the fundamental control devices in such a mechanized classification yard. In one type of car retarders, electropneumatic means are employed to actuate the retarders to apply a retarding force or braking pressure against the wheels of a moving car such that the car leaves the retarder at a preselected speed.

There are several variables which determine the velocity at which each car or cut of cars should leave the retarder units. For example, basic considerations are the weight of the cars and the distance the cars must travel to a designated track. Other considerations are wind resistance, track curvature, impact of coupling, and various other factors which influence the moving cars.

It can therefore be readily appreciated that the desired braking pressure applied to the wheels of each of the cars may vary considerably. Further, it is desirable that the pneumatic pressure in the retarder be automatically varied as the cars move through the retarder in accordance with the rate at which the car velocity is approaching the desired leaving speed in order that braking force applied to the cars be smooth in effect.

Accordingly, it is a principal object of the present invention to provide an electronic control circuit for railroad car retarders.

It is another object of the present invention to provide an electronic control circuit for controlling electromagnetically energized valve means of pneumatic railroad car retarders such that the braking pressure applied to moving cars reduces the velocity of said cars smoothly to a preselected speed.

In the attainment of the foregoing objects of our invention we provide an electronic control circuit including means for receiving a first input signal proportional to the actual velocity of a railroad car, means for receiving a second input signal proportional to a preselected leaving speed of said car, and means for processing the two said signals to provide a signal proportional to the sum of said two input signals. Means are provided for accepting a changing signal corresponding to the velocity deceleration of said car and for amplifying and processing said changing signal to provide differentiation thereof. Means are further provided for processing the signal proportional to the sum of the two inputs in relation to the differentiated signal to energize relay means adapted to cause electromagnetically energized valve means to open and close in a predetermined manner to actuate a car retarder mechanism.

Figure 3:
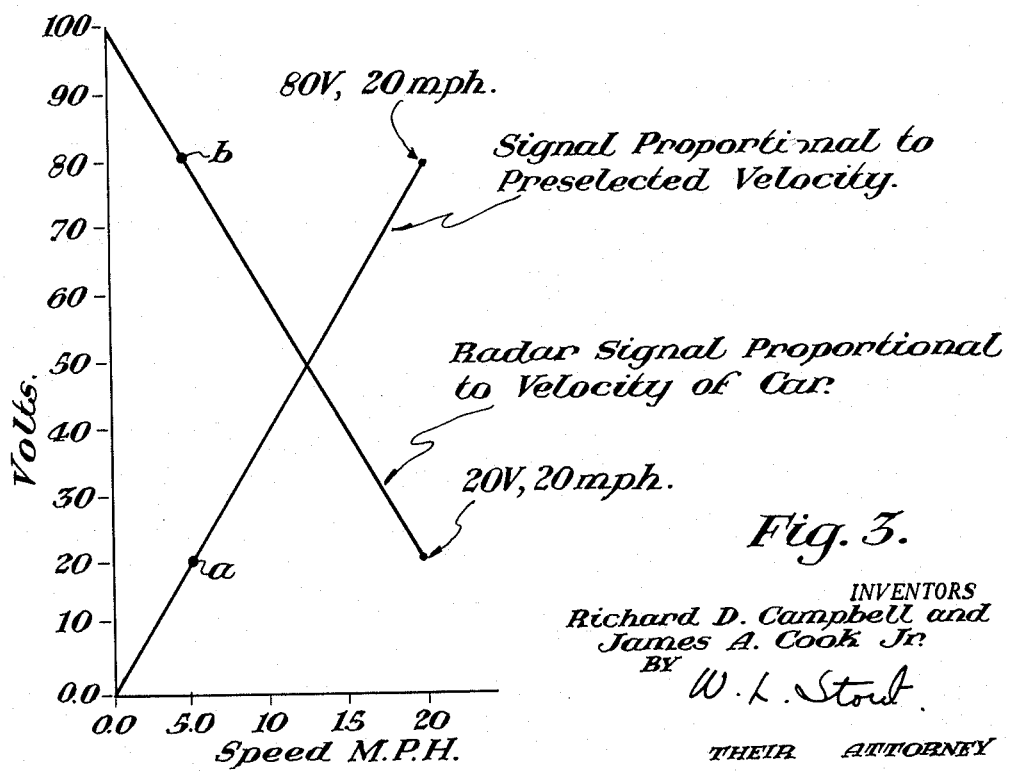
Figure 2:
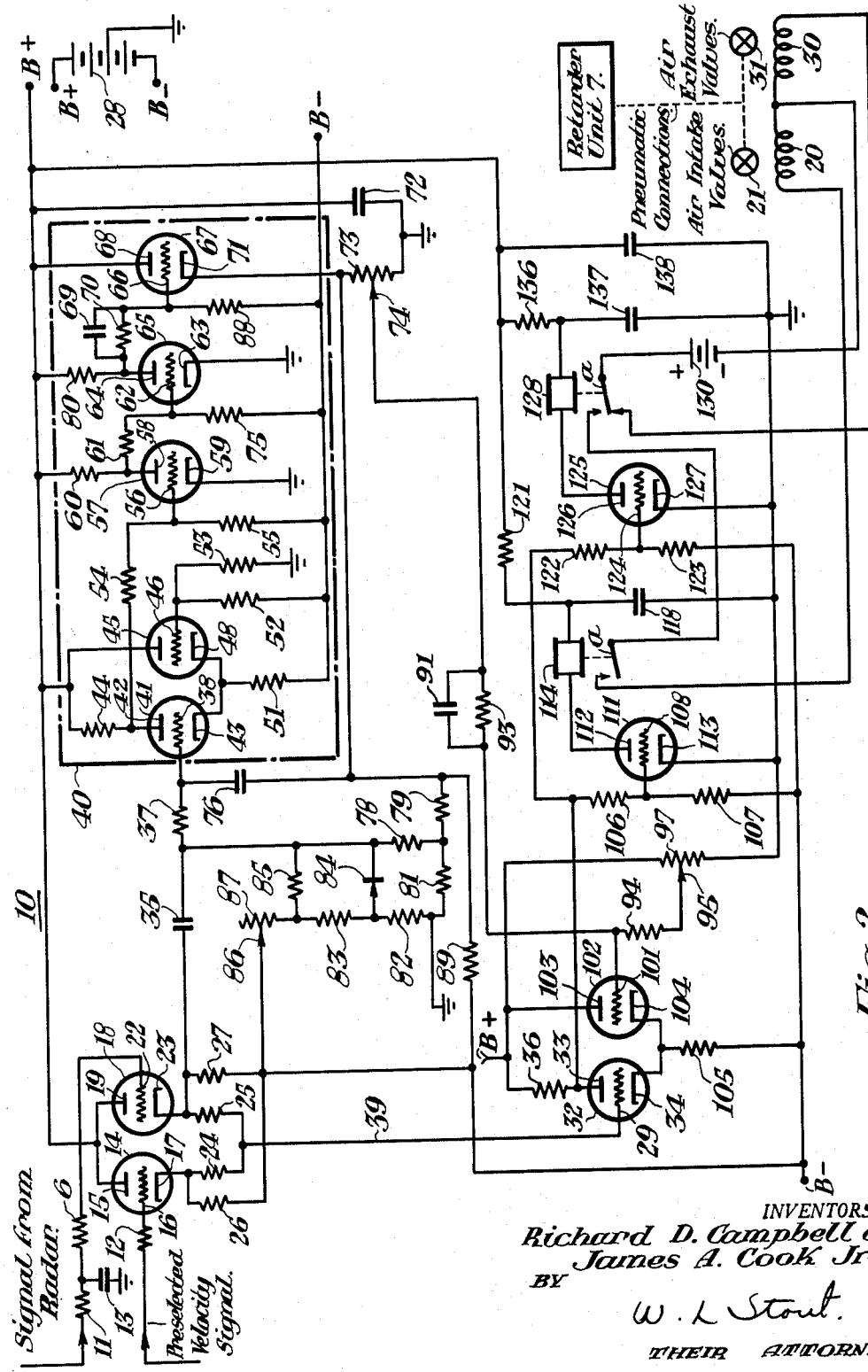

Other objects and advantages of the present invention will become apparent from the following description and the accompanying drawings in which like reference characters refer to like elements throughout and in which:

FIG. 1 is a view, partially in isometric and partially in block form, of the electronic control circuit of the present invention in one environment, FIG. 2 is a schematic diagram of the electronic control circuit of FIG. 1, and FIG. 3 is a graph useful in describing the operation of the control circuit of FIG. 2.

We shall first describe one embodiment of an electronic control circuit according to the present invention, and shall then point out the novel features thereof in the appended claims. Although the embodiment of the circuit herein shown discloses electron discharge devices of the vacuum tube type, it will be understood that the invention is not limited thereto but that transistors may be employed in their stead with suitable modifications of the circuit as is well known in the art.

Referring to FIG. 1 a railroad car 8 is shown moving down a track incline or hump. A radar unit 9 is mounted along the lower portion of the incline and in accordance with the known Doppler effect provides a signal which is a measure of the velocity or speed of the railroad car 8 as the car moves down the incline. The radar unit 9 is coupled to an electronic control circuit 10 constructed in accordance with the present invention. Concurrently, a signal proportional to the preselected velocity or speed at which the car 8 should leave the retarder unit is coupled to the control circuit 10. As mentioned hereinabove the leaving speed may be determined by the weight of the cars and the distance the car must travel to its track, as well as various other factors. All of these factors may be measured by appropriate sensing devices, not shown, and the information processed by computers, also not shown, to provide a suitable preselected leaving signal to the electronic control circuit 10. Certain types of the foregoing sensing devices, and the computer are disclosed more fully in the hereinabove mentioned application of David P. Fitzsimmons and William A. Robison, Jr., Serial No. 676,730.

The electronic control circuit 10 processes the radar signal in relation to the preselected leaving velocity or speed signal, as will be detailed more fully hereinbelow, to energize inductive windings 20 and 30 to actuate associated pneumatic valves 21 and 31 which are connected to the retarder unit 7 such that the retarder applies the required braking force to the wheels of the moving railroad car 8 to slow the car down to the preselected leaving speed.

Referring now to FIG. 2, a signal from the radar unit 9 is coupled to the control electrode 22 of electron discharge device 18 at the input of control circuit 10. Concurrently the preselected leaving velocity signal is coupled to the control electrode 16 of electron discharge device 14. Electron discharge devices 14 and 18 are similar and are connected as cathode followers, both having similar cathode impedances in the form of resistors 26 and 27 connected to their respective cathodes 17 and 23. Two resistors 24 and 25 having identical impedance values are connected between the cathodes 17 and 23. A lead 39 connects to the junction of resistors 24 and 25 and couples a voltage which may be designated as $E_0$, to the control electrode 29 of electron discharge device 32. It has been found that the voltage, $E_0$, is related to the voltage at the cathodes 17 and 23 as follows:

$$E_0 = \frac{E_1 + E_2}{2} \quad (A)$$

where $E_1$ is the voltage at cathode 17 and $E_2$ is the voltage at cathode 23.

A second output is coupled from the cathode 23 through a capacitor 35 to a high-gain direct coupled amplifying section 40. The amplifying section 40 functions to amplify only those voltage variations which correspond to the variations of velocity of the moving car 8, FIG. 1, and tends to filter out short-time interval variations due to noise or other causes.

The output from the amplifying section 40 is coupled by a wiper arm 74 from a voltage divider 73 to the control electrode 101 of an electron discharge device 102. The electron discharge devices 32 and 102 are similar and have their respective cathodes 34 and 104 connected to one another and to a terminal of a common cathode resistor 105. The electron discharge devices 32 and 102 function as a differential amplifier, and the input signal to the control electrode 29 of electron discharge device 32, as well as the input signal to the control electrode 101 of electron discharge device 102, affects the output signal taken from the anode 33 of electron discharge device 32. The output signal from electron discharge device 32 is coupled in parallel to the control electrode 108 of an electron discharge device 111 and to control electrode 124 of an electron discharge device 125. A relay 114 is connected in the anode 112 circuit of electron discharge device 111 and a similar relay 128 is connected in the anode 126 circuit of electron discharge device 125. A signal of predetermined amplitude will cause electron discharge devices 111 and 125 to conduct, thereby energizing relays 114 and 128 to complete a circuit from a positive terminal of a source 130 through electromagnetic winding 20 to the negative terminal of source 130. Current flow therethrough energizes winding 20 and causes air intake or inlet valves 21 to be actuated to provide air under pressure to the retarder unit and thereby to provide a braking force on car 8, FIG. 1.

When current flow through electron discharge devices 111 and 125 ceases, the relays 114 and 128 will be deenergized. When deenergized, relay 128 closes its back contact $a$ to complete a circuit from the positive terminal of source 130 through winding 30 to the negative terminal of source 130. The air exhaust valves 31 will be magnetically energized to exhaust the air from the retarder unit 7 and thereby remove the braking force on car 8, FIG. 1. The operation of the valves and of the retarder units is described more fully in the above-mentioned copending application of David P. Fitzsimmons and William A. Robison, Jr., Serial No. 676,730.

In more detail, a signal from radar 9, FIG. 1, which signal is a varying direct current voltage signal whose amplitude is proportional to the instantaneous velocity of the railroad car 8, is coupled through a filter circuit consisting of a series-connected resistor 11, a shunt connected capacitor 13, and a second series-connected resistor 6 to the control electrode 22 of electron discharge device 18 in control circuit 10, FIG. 2. The electron discharge device 18 includes a cathode 23, an anode 19 and the control electrode 22.

A signal having an amplitude proportional to the preselected leaving velocity is coupled through a series-connected resistor 12 to the control electrode 16 of electron discharge device 14. Electron discharge device 14 includes a cathode 17, an anode 15 and the control electrode 16. The preselected leaving speed is determined by various sensing devices and a computer, not shown, but which are described in detail in the above-mentioned copending application of David P. Fitzsimmons and William A. Ribson, Jr. The electron discharge devices 14 and 18 are similar, and both are connected as cathode followers. As noted above, resistor 26 in the cathode 17 circuit and resistor 27 in the cathode 23 circuit are of identical impedance values and have a common junction. The two resistors 24 and 25 which are also of identical impedance values are connected in series between the cathodes 17 and 23. The lead 39 connected to the junction of the resistors 24 and 25 couples the voltage developed at that point to the control electrode 29 of electron discharge device 32.

The voltage input to the control circuit 10 from the radar 9 may be, for example, as shown in FIG. 3, such that the voltage at cathode 23 is approximately 100 volts when the velocity of the car 8 is 0.0 mile per hour and varies linearly to approximately 20 volts when the velocity of the car is 20 miles per hour. The preselected velocity signal voltage input to the control circuit 10 may be, as shown in FIG. 3, such that a voltage of 0.0 volt coupled to control electrode 16 corresponds to approximately 0.0 mile per hour and varies linearly to 80 volts to correspond to a velocity of approximately 20 miles per hour. When the velocity of the car 8 equals the preselected velocity, the sum of the corresponding output voltages is 100 volts, and lead 39 will couple a voltage of 100 divided by two or 50 volts to control electrode 29 as indicated by Formula A above. For example, assume the preselected velocity is 5.0 miles per hour, the voltage signal will be about 20 volts in amplitude, see point $a$, FIG. 3. If the velocity of the car is equal to the preselected velocity, the received radar signal will have an amplitude of about 80 volts, see point $b$, FIG. 3, and the sum of the two signal voltages will be 100 volts.

Referring again to FIG. 2, the variations of the radar voltage signal which are proportional to the velocity variations or deceleration of the affected car are coupled from the cathode 23 of electron discharge device 18 through the capacitor 35 and resistor 37 to the control electrode 38 of electron discharge device 41 in the high-gain amplifying section 40. The amplifying section 40 includes the electron discharge devices 41, 45, 57, 65 and 67 each of which electron discharge devices includes a cathode, a control electrode and an anode. The cathodes 43 and 48 of electron discharge devices 41 and 45, respectively, are connected to one another and have a common cathode resistor 51. Electron discharge device 45 is biased through resistors 52 and 53 to be normally conducting. Because of current flow through electron discharge device 45 and the consequent voltage developed across resistor 51, electron discharge device 41 is normally biased to be just barely conducting.

A positive signal impressed on the control electrode 38 will tend to overcome the bias and cause electron discharge device 41 to conduct more heavily. The signal from anode 42 of electron discharge device 41 is coupled through resistor 54 to the control electrode 56 of electron discharge device 57, which device has its anode 58 connected through a voltage dropping resistor 60 to the positive terminal B+ of source 28, and its cathode 59 connected to ground reference. The resistor 44 connected to the anode 42 is a usual voltage dropping resistor. The resistor 55 connected in shunt to the control electrode 56 is a usual bias resistor. The output from electron discharge device 57 is coupled from the anode 58 through a resistor 61 to the control electrode 62 of electron discharge device 65, which device has its anode 64 connected through a voltage dropping resistor 80 to the positive terminal B+ of source 28 and its cathode 63 connected to ground reference. The resistor 75 connected in shunt to the control electrode 62 is a usual bias resistor. The output from electron discharge device 65 is coupled from the anode 64 through a network, consisting of a capacitor 69 and a resistor 70 connected in parallel, to the control electrode 66 of electron discharge device 67. The capacitor 69 tends to reduce the circuit impedance at high frequencies and to change the resistance-capacitance time constant of the circuit at high frequencies to suppress any undesired oscillations. The resistor 88 connected in shunt to the control electrode 66 is a usual bias resistor. The electron discharge device 67 has a voltage divider 73 connected in its cathode 71 circuit thereof. One output from electron discharge device 67 is coupled by a wiper arm 74 bearing on voltage divider 73 through a network consisting of a capacitor 91 and a resistor 93, connected in parallel, to the control electrode 101 of electron discharge device 102. A second output from electron discharge device 67 is coupled as a negative feedback voltage to the control electrode 38 of the electron discharge device 41 in the input of the amplifying section 40. The feedback voltage is processed, as will be detailed hereinbelow, by a feedback network including capacitors 35 and 76, and resistors 37, 78 and 79, prior to coupling to the control electrode 38. A capacitor 72 connected in parallel with electron discharge device 67 is a usual filter capacitor for the direct current source 28.

As noted above, the radar signal coupled through capacitor 35 and resistor 37 to the control electrode 38 of the electron discharge device 41 is proportional to the change of velocity of the moving car. This signal varies relatively slow and may be contaminated by short-time interval randomly varying signals, such as noise. It is desired to differentiate the slowly varying signal to provide a signal proportional to the rate of change of velocity without responding to noise or any rapidly varying signals.

The feedback network consists of two feedback paths. The first feedback path comprises the capacitor 76, which is connected between the cathode 71 of the electron discharge device 67 in the output of the amplifying section 40 and the control electrode 38 of the electron discharge device 41 in the input of the amplifying section 40. The second feedback path includes the resistors 78 and 79 connected in parallel with capacitor 76 and connected to the junction of capacitor 35 and resistor 37.

The capacitor 35 and the resistors 78 and 79 in combination with the amplifying section 40 differentiate the slowly varying signals while the capacitor 76 and the resistor 37 provide a network for integrating those signals having frequencies above the frequencies corresponding to the variation of car speeds. Thus, the feedback network and the amplifying section 40 are sensitive only to the rate of change of slowly varying input signals and will tend to attenuate rapidly varying short-time interval signals. The output voltage of the amplifying section 40 is thus proportional to the rate of change of the relatively slowly varying voltage corresponding to the change of velocity of the railroad car and is free of interference due to noise or any rapidly varying signals. A feedback network of the above type is disclosed in the copending application for Letters Patent of the United States, Serial No. 582,249, filed May 2, 1956, by Richard D. Campbell, for a Differentiator, now Patent 2,901,609, issued August 25, 1959.

A diode rectifier 84 of the so-called Zener diode type provides overload protection. For example, assuming the control circuit is quiescent and a car 8 enters the retarder unit 7 at a relatively high velocity, the high amplitude signal input to the control circuit 10 will charge the capacitor 35 to such a high potential that it will not discharge to a normal level through the resistor 85 in time for the amplifying section 40 to operate properly. However, the high positive amplitude signal input to control circuit 10 will cause the Zener diode 84 to conduct in a reverse direction, thus in effect shorting out resistor 85 to decrease the time constant of capacitor 35 for the purpose of dissipating any high amplitude charge on capacitor 35 through diode 84 to ground relatively fast.

A voltage dividing network including resistors 82, 83 and a variable resistor 87 having a wiper arm 86 thereon provides an impedance adjustment for zeroing the control circuit 10 by controlling the level of conduction through the electron discharge device 41. The overload circuit is interconnected with the zeroing circuit such that regardless of the zeroing point the overload circuit retains its characteristics.

Resistors 79 and 81 are voltage dividing impedances. A resistor 89 inserted between the B-terminal of source 28 and the connection of voltage divider 73 to cathode 71 of electron discharge device 67 provides a means of obtaining a negative voltage output from electron discharge device 67.

As noted hereinabove, the output obtained from the amplifying section 40 is the derivative of the varying input signal voltage, that is, the output is a measure of the rate of change of velocity of the car. The output from amplifying section 40 is coupled from voltage divider 73 through wiper arm 74, and through a network consisting of the capacitor 91 and the resistor 93, connected in parallel, to the control electrode 101 of electron discharge device 102. Resistor 93 couples the first derivative signal from amplifying section 40 to control electrode 101. Capacitor 91 in conjunction with resistor 94 and voltage divider 97 functions to differentiate the output signal from amplifying section 40. The voltage applied to control electrode 101 is thus a combination of the first and second derivatives of the radar input signal. The derivatives of the input signal are employed to provide a suitable damping factor for the control system, as is well known in the art.

The electron discharge devices 32 and 102 include cathodes 34 and 104, the control electrodes 29 and 101, and anodes 33 and 103, respectively. The cathodes 34 and 104 are connected to one another and to a common terminal of a cathode resistor 105. The electron discharge devices 32 and 102 are thus connected to function as a differential amplifier. The differential voltage coupled to control electrode 101 is in effect reflected through the cathodes 104 and 34 to electron discharge device 32. The output taken from anode 33 of electron discharge device 32 is a signal which is a measure of the difference between the signal propotrional to the preselected leaving speed voltage as it has been combined with the radar voltage, and the differentiated radar signal voltage which is proportional to a rate of change of velocity of the car 8.

The resistors 93 and 94, and voltage divider 97 provide a bias for the differential amplifier such that a quiescent condition is obtained when the car being retarded is moving at a proper speed and a zero voltage output is being coupled by arm 74 from cathode resistor 73 to control electrode 101. In this quiescent condition the differential amplifier output causes relay 128 to be energized to close its front contact *a* while relay 114 remains deenergized and its front contact remains open, as will be detailed hereinbelow, and both the intake or inlet valves 21 and the exhaust valves 31 remain closed.

The output from anode 33 is coupled in parallel through resistor 106 to the control electrode 108 of the electron discharge device 111, and through resistor 122 to the control electrode 124 of the electron discharge device 125. Electron discharge devices 111 and 125 include cathodes 113 and 127, control electrodes 108 and 124, and, anodes 112 and 126, respectively. A relay 114 is connected in series with the anode 112 circuit, and a relay 128 is connected in series in the anode 126 circuit.

The resistors 107 and 123 connected to the control electrodes 108 and 124, respectively, are the usual bias resistors. The resistors 121 and 136 connected between the positive terminal B+ of source 28 and the relays 114 and 128 connected to anodes 112 and 126, respectively, are the usual anode voltage dropping resistors. Capacitors 118, 137 and 138 function as filter capacitors for the source 28.

Relay 114 is energized to close its front contact *a* due to conduction in electron discharge device 111 and relay 128 is energized to close its front contact *a* due to conduction in electron discharge device 125. Conduction in both electron discharge devices 111 and 125 concurrently causes both relays 114 and 128 to be energized to close their respective front contacts *a* to complete an electrical circuit from the positive terminal of source 130 through winding 20 and to the negative terminal of source 130. The resulting current flow through winding 20 will produce a flux which actuates air intake or inlet valves 21 to provide air under pressure to the retarder unit 7, which retarder unit in turn develops a braking force on the wheels of the moving car.

When electron discharge device 125 ceases conduction, the relay 128 is deenergized to close its back contact *a* to complete an electrical circuit from the positive terminal of source 130 through winding 30 to the negative terminal of source 130. The resulting current flow through winding 30 will produce a flux which actuates air exhaust valves 31 to exhaust the air from the retarder unit 7 to remove the braking force on the wheels of the moving car.

The resistor 122 thorugh which the signal from anode 33 is coupled to control electrode 124 is of somewhat smaller impedance value than resistor 106, and there is proportionally less of a voltage drop across resistor 122 than across resistor 106. Electron discharge device 125 will therefore begin to conduct slightly ahead, in time, of electron discharge device 111, resulting in relay 128 being energized to open its back contact *a* and close its front contact *a* slightly before relay 114 is energized to close its front contact *a*. The electrical circuit from the positive terminal of source 130 through winding 30 to the negative terminal of source 130 will be interrupted to assure that exhaust valves 31 close before the intake or inlet valves 21 are actuated open by winding 20. There is thus a "dead" zone to provide a period in which the air inlet valves 21 and the exhaust valves 31 are both closed just prior to the time the air inlet valves are actuated open to admit air to the retarder unit. This condition is desirable to effect a smooth control of the retarder mechanism. Conversely, electron discharge device 111 will cease conduction slightly before electron discharge device 125 ceases conduction and relay 114 will be deenergized to open its front contact *a* before relay 128 is deenergized to open its front contact *a* and close its back contact *a*. This assures that the air inlet valves 21 are closed before the air exhaust valves 31 are actuated open.

While our invention has been described with reference to a particular embodiment thereof, it will be understood that various modifications may be made by those skilled in the art without departing from the invention. The appended claims are therefore intended to cover all such modifications within the true spirit and scope of the invention.

Having thus described our invention, what we claim is:

1. A control circuit for electrically controlled railroad car retarders comprising, means receiving a first voltage proportional to the velocity of a car being retarded, means receiving a second voltage proportional to a preselected velocity, means combining said first and second voltages to provide a third voltage proportional to said first and second voltages; means differentiating said first voltage, means combining said third voltage and the differentiated voltage to provide a control voltage, and means responsive to said control voltage and arranged to actuate said retarders whereby said car is retarded to said preselected velocity.

2. A control circuit for railroad car retarder systems comprising, means receiving a first voltage signal of varying amplitude proportional to the velocity of a car being retarded, means receiving a second voltage signal of an amplitude proportional to a preselected velocity to which said car is to be retarded, means combining said first and second voltage signals to provide a voltage signal proportional to the sum thereof, means obtaining the first derivative of the variation of said first voltage signal for obtaining the rate at which the velocity of said car is approaching the preselected velocity, means combining the voltage proportional to the sum of said first and second voltages and the differentiated voltage to provide a control voltage, and retarder control means responsive to said control voltage.

3. A control circuit for electropneumatically actuated railroad car retarder systems comprising, means receiving a first voltage signal of varying amplitude proportional to the velocity of a car being retarded, means receiving a second voltage signal of an amplitude proportional to a preselected velocity to which said car is to be retarded, means combining said first and second voltage signals to provide a voltage signal proportional to the sum thereof, means obtaining the first derivative of the variations of said first voltage signal, said first derivating providing an indication of the rate at which the velocity of said car is approaching the preselected velocity, means obtaining the second derivative of said first voltage signal, a differential amplifier combining said voltage proportional to said first and second voltages and said differentiated voltage to provide a control voltage, relay means receiving the control voltage from said differential amplifier, and valve control means arranged to be actuated by said relay means such that a preselected pressure is provided to said retarders for applying a smooth retarding force to said car to retard said car to said preselected velocity.

4. A control circuit for valve means of an electropneumatic railroad car retarder comprising, a plurality of electron discharge devices each having an anode, a control electrode, and a cathode, the control electrode of a first of said electron discharge devices arranged to receive a direct current voltage proportional to the actual speed of a railroad car being retarded, the control electrode of a second of said electron discharge devices arranged to receive a direct current voltage proportional to a computed speed to which the railroad car is to be retarded, impedance elements connecting the cathodes of said first and second electron discharge devices to one another, an amplifying circuit receiving a varying voltage signal proportional to the change in the velocity of said railroad car, a feedback network for said amplifying circuit, said feedback network including resistance and capacitance elements arranged to differentiate said varying voltage and concurrently to attenuate rapidly varying voltages, an overload circuit for said control circuit, a zeroing circuit for said control circuit, said overload circuit and said zeroing circuit being interconnected, a differential amplifier comprising a third and a fourth electron discharge device, means coupling a voltage from an impedance midpoint on said impedance elements to the control electrode of one of the electron discharge devices of said differential amplifier, means coupling an output from said amplifying circuit to the other of the electron discharge devices of said differential amplifier, output means for said control circuit comprising a fifth and a sixth electron discharge device connected in parallel, the operating winding of a relay connected in the anode circuit of each of said fifth and sixth electron discharge devices in said output means, means coupling the output of said differential amplifier to the control electrodes of said fifth and sixth electron discharge devices, an energizing source, and electromagnetic windings arranged to be connected by said relay to said energizing source whereby said valve means are actuated.

5. A control circuit for railroad car retarders comprising, a plurality of electron discharge devices each having an anode, a control electrode, and a cathode, the control electrode of a first of said electron discharge devices being arranged to receive a relatively slowly varying direct current voltage proportional to the velocity of said railroad car, the control electrode of a second of said electron discharge devices being arranged to receive a voltage proportional to a preselected velocity, an impedance element connecting the cathodes of said first and second electron discharge devices to one another, an amplifying circuit arranged to receive said relatively slowly varying direct current voltage from the cathode of said first electron discharge device, a feedback network for said amplifying circuit, said feedback network including two feedback paths arranged to provide differentiation of said varying voltage and attenuation of any undesired voltages of higher frequencies, a differential amplifier comprising a pair of electron discharge devices, means coupling a voltage proportional to one-half of the sum of the amplitude of the voltage proportional to the velocity of said railroad car and the voltage proportional to the preselected velocity being developed at an impedance midpoint of said impedance element due to current flow in said first and second electron discharge devices to one of said electron discharge devices of said differential amplifier, means coupling an output from said amplifying circuit to the other electron discharge device of said differential amplifier, output means for said control circuit including third and fourth electron discharge devices connected in parallel, means including impedance elements having different impedance values for connecting the output of said differential amplifier to the control electrodes of said third and fourth electron discharge devices in said output means such that these electron discharge devices are energized and deenergized at slightly different times, the operating winding of a relay connected in the anode circuit of each of said third and fourth electron discharge devices in said output means, and electromagnetic windings for controlling said retarders and arranged to be connected by said relays to energizing sources in a predetermined manner.

6. A control circuit for railroad car retarders comprising, means receiving a first input signal proportional to the velocity of the railroad car being retarded, means receiving a second input signal proportional to a preselected velocity at which said car should leave said retarder, means for combining the said input signals to provide a signal proportional to the sum of said input signals and for providing a signal of predetermined amplitude when the velocity of the car being retarded equals the preselected velocity, amplifying means receiving a varying signal corresponding to the change of velocity of said car, means obtaining a first differentiation of said varying signal for providing a rate of change of said velocity, means obtaining a second differentiation of said varying signal for providing a damping factor, means combining said signal proportional to the sum of said input signal and said differentiated signal to provide a control signal, relay means energized by said control signal, a car retarder, and means controlling said car retarder arranged to be energized by said relay means.

7. A control circuit for a retarder for controlling the velocity of a railroad car comprising, means receiving a first input signal proportional to the velocity of the railroad car being controlled, means receiving a second input signal proportional to a preselected speed to which said car is to be retarded, means combining said input signals in relation to one another to provide a signal proportional to the sum of said input signals, means receiving a signal proportional to the change of velocity of said car, means differentiating said signal proportional to the change of velocity for providing the first and second derivatives thereof with respect to time, means combining said signal proportional to the sum of said input signals in relation to said differentiated signal to provide a control signal, relay means energized by said control signal, a car retarder, and means controlling said car retarder arranged to be energized by said relay means.

8. A control circuit for electrically controlled railroad car retarders comprising, means receiving a first input signal proportional to the velocity of a car being retarded, means receiving a second input signal proportional to a preselected velocity, means combining said first and second signals to provide a third signal proportional to a combination of said first and second signals; means differentiating a signal characteristic of said first signal, means combining said third signal and the differentiated signal to provide a control signal, and means responsive to said control signal and arranged to actuate said retarders whereby said car is retarded to said preselected velocity.

9. In a control system for a gravity classification yard having a car retarder disposed at an intermediate point in a stretch of track, said car retarder being operable to provide a controlled degree of braking for the car, means for obtaining a first signal substantially continuously variable in accordance with the speed of a car within the car retarder, means for obtaining a second signal characteristic of a computed desired speed for the car to leave the car retarder, means for combining said first and second signals and obtaining a third signal, means for substantially continuously obtaining a fourth signal proportional to the rate of change of said first signal when a car is within the car retarder, and control means for said car retarder controlled jointly by said third and fourth signals for adjusting the degree of braking applied by said car retarder to the car in order to release the car at the computed desired speed.

References Cited by the Examiner
UNITED STATES PATENTS

| | | | |
|---|---|---|---|
| 2,491,542 | 12/1949 | Woodyard et al. | 343—8 |
| 2,502,464 | 4/1950 | Lehmann | 343—8 |
| 2,524,610 | 10/1950 | Storm et al. | 343—8 |
| 2,661,070 | 12/1953 | Ferrill | 246—182 X |
| 2,715,219 | 8/1955 | Otto et al. | 343—8 |
| 2,719,911 | 10/1955 | Maenpaa | 246—182 |
| 2,719,912 | 10/1955 | Maenpaa et al. | 246—182 |
| 2,721,258 | 10/1955 | Freehaefer | 246—182 |
| 2,733,436 | 1/1956 | Doba et al. | 343—7 |
| 2,743,437 | 4/1956 | Davenport | 343—8 |
| 2,770,775 | 11/1956 | Agnew | 246—182 X |
| 2,803,743 | 8/1957 | Ballerait | 246—182 |

ARTHUR L. LA POINT, *Primary Examiner.*

LEO QUACKENBUSH, JAMES S. SHANK,
*Examiners.*

S. T. KRAWCZEWICZ, *Assistant Examiner.*